US012798767B2

(12) United States Patent
Davies

(10) Patent No.: US 12,798,767 B2
(45) Date of Patent: Nov. 17, 2026

(54) AIRCRAFT CONTROL SYSTEM

(71) Applicant: SAFRAN LANDING SYSTEMS UK LTD., Gloucester (GB)

(72) Inventor: Christopher Stuart Davies, Gloucester (GB)

(73) Assignee: SAFRAN LANDING SYSTEMS UK LTD., Gloucester (GB)

( * ) Notice: Subject to any disclaimer, the term of this patent is extended or adjusted under 35 U.S.C. 154(b) by 0 days.

(21) Appl. No.: 19/149,014

(22) PCT Filed: Jan. 25, 2024

(86) PCT No.: PCT/GB2024/050194
§ 371 (c)(1),
(2) Date: Jul. 17, 2025

(87) PCT Pub. No.: WO2024/157010
PCT Pub. Date: Aug. 2, 2024

(65) Prior Publication Data
US 2026/0217366 A1 Jul. 30, 2026

(30) Foreign Application Priority Data
Jan. 25, 2023 (GB) ...................................... 2301069

(51) Int. Cl.
*B64C 25/22* (2006.01)
*B64C 25/28* (2006.01)
(Continued)

(52) U.S. Cl.
CPC .............. *B64C 25/28* (2013.01); *B64C 25/22* (2013.01); *B64C 25/44* (2013.01); *B64C 25/50* (2013.01);
(Continued)

(58) Field of Classification Search
CPC .......... B64C 25/28; B64C 25/22; B64C 25/44
See application file for complete search history.

(56) References Cited

U.S. PATENT DOCUMENTS 10,464,663 B2 * 11/2019 Luce ........................ B64C 25/50
11,260,961 B2 3/2022 Howell et al.
(Continued)

FOREIGN PATENT DOCUMENTS

| | | | |
|---|---|---|---|
| GR | 1004181 | B | 3/2003 |
| JP | 2018-094969 | A | 6/2018 |
| JP | 2020-026209 | A | 2/2020 |

OTHER PUBLICATIONS

GB Search Report received for Great Britain App. No. 2301069.7, mailed on Jul. 14, 2023, 5 pages (with Republished Specification).
(Continued)

*Primary Examiner* — Brian M O'Hara
(74) *Attorney, Agent, or Firm* — WOMBLE BOND DICKINSON (US) LLP

(57) ABSTRACT

A control system for a battery-powered aircraft, the control system including a landing gear assembly moveable between a retracted position in which the landing gear assembly is housed within the aircraft and an extended position in which the landing gear assembly is deployed, the landing gear assembly including a main landing gear; and a nose landing gear; at least one local hydraulic pressure source configured to receive power from at least one battery; a landing gear controller configured to receive and deliver control inputs to the hydraulic pressure source; and at least one actuator in fluid communication with the hydraulic pressure source and configured to move the landing gear assembly between the retracted position and the extended position in response to inputs received by the landing gear controller; wherein at least one of the main landing gear and
(Continued)

nose landing gear is biased in the retracted position by hydraulic pressure.

14 Claims, 4 Drawing Sheets

(51) Int. Cl.

| | |
|---|---|
| ***B64C 25/44*** | (2006.01) |
| ***B64C 25/50*** | (2006.01) |
| ***B64D 27/34*** | (2024.01) |
| ***B64D 27/357*** | (2024.01) |
| ***B64D 45/00*** | (2006.01) |
| ***F15B 1/04*** | (2006.01) |
| ***F15B 19/00*** | (2006.01) |

(52) U.S. Cl.

CPC ........... *B64D 27/34* (2024.01); *B64D 27/357* (2024.01); *B64D 45/00* (2013.01); *F15B 1/04* (2013.01); *F15B 19/00* (2013.01); *B64D 2045/0085* (2013.01)

(56) References Cited

U.S. PATENT DOCUMENTS

| | | | | |
|---|---|---|---|---|
| 11,614,103 | B2 * | 3/2023 | Onishi | B64C 25/22 60/420 |
| 11,619,311 | B2 * | 4/2023 | Prathibha | F16K 3/265 137/87.03 |
| 2016/0129996 | A1 | 5/2016 | Boucher et al. | |
| 2022/0136532 | A1 | 5/2022 | Onishi et al. | |

OTHER PUBLICATIONS

International Search Report and Written Opinion received for PCT App. No. PCT/GB2024/050194, mailed on May 17, 2024, 21 pages.
Invitation to Pay Additional Fees received for PCT App. No. PCT/GB2024/050194, mailed on Mar. 26, 2024, 12 pages.

* cited by examiner

AIRCRAFT CONTROL SYSTEM

TECHNICAL FIELD

The present invention relates to a control system for an aircraft landing gear system. Specifically, the present invention relates to an improved hydraulic system for an aircraft landing gear.

BACKGROUND

As will be understood by a person skilled in the design of aircraft landing gear systems, central hydraulic systems generally include: a reservoir, a pump, an accumulator, and one or more actuators. The reservoir functions as storage for the hydraulic fluid and also allows for air to be bled from the system. Hydraulic fluid for the system can be replenished in the reservoir. The pump is typically engine-driven or driven by an electric motor which is powered by an engine-driven generator and thus receives power from the rotation of the engines. The accumulator stores energy and a limited quantity of pressurised hydraulic fluid which may be used in emergency situations. The one or more actuators convert the force of fluid flow into mechanical power.

Central hydraulic systems are generally driven continuously, directly or indirectly, by the engine(s) of the aircraft, the energy source ultimately being from hydrocarbon fuel stored in fuel tanks, and the pump is used to draw pressurised hydraulic fluid from a reservoir into a complex network of pipes throughout the aircraft. The hydraulic fluid is then delivered to several hydraulically powered parts, such as actuators for flight control surfaces—for example ailerons, elevators, and rudders—or thrust reversers. The hydraulic fluid subsequently returns to the reservoir and is recirculated.

Conventional aircraft landing gear systems typically function hydraulically and, for this purpose, are powered by a central hydraulic system as described. To provide redundancy and thereby improve safety a second, identical, hydraulic system may be included in the aircraft. With this arrangement the failure of either hydraulic system can be mitigated by using the other hydraulic system. Otherwise, a backup mechanism may be employed to provide an alternative source of hydraulic pressure to perform a critical function.

To improve fuel economy aircraft systems must be made more lightweight. There is therefore a need for an improved aircraft landing gear system.

SUMMARY OF THE INVENTION

The inclusion of a central hydraulic system and the requirement to incorporate a backup hydraulic system adds significant weight to aircraft. Further, such installations for landing gear can be inefficient as an engine-driven pump receives rotational power from the engine continuously, despite the landing gear only requiring power during take-off and landing operations. In aircraft without a conventional gas turbine engine, neither an engine-driven pump nor an electric motor powered by an engine driven generator is not available. Thus, there is a need for a landing gear system which requires fewer components and is compatible with an alternative power source.

According to a first aspect of the invention, there is provided a control system for a battery-powered aircraft, the control system comprising:

a landing gear assembly moveable between a retracted position in which the landing gear assembly is housed within the aircraft and an extended position in which the landing gear assembly is deployed from the aircraft, the landing gear assembly comprising:
- a main landing gear; and
- a nose landing gear;

at least one local hydraulic pressure source configured to receive power from at least one battery;

a landing gear controller configured to receive and deliver control inputs to the brake control system and the at least one local hydraulic pressure source; and at least one actuator in fluid communication with the at least one local hydraulic pressure source and configured to move the landing gear assembly between the retracted position and the extended position in response to inputs received by the landing gear controller;

wherein at least one of the main landing gear and nose landing gear is biased in the retracted position by hydraulic pressure.

With this arrangement, a more lightweight hydraulic system is provided in comparison to a central hydraulic system. This can improve fuel economy and in turn increase the range of a battery-powered aircraft of a given size.

The main landing gear and/or the nose landing gear may be provided without mechanical uplocks. That is, the landing gear assembly may omit mechanical uplocks.

The main landing gear and/or the nose landing gear may therefore be biased in the retracted position substantially exclusively by hydraulic pressure which is periodically supplied by the at least one local hydraulic pressure source.

This configuration provides a more lightweight landing gear assembly in comparison to a system which retains the landing gear in the retracted position by means of uplocks.

At least one of the main landing gear and nose landing gear may be biased in the retracted position by hydraulic pressure which is periodically supplied by the at least one local hydraulic pressure source.

By providing pressure to the main landing gear and/or nose landing gear periodically, they may be retained in the retracted position whilst consuming very little power as there is no need to provide constant hydraulic pressure. In general, such a configuration facilitates the removal of any positive means of retention for the landing gear, and in turn saves weight. A positive means of retention refers to a mechanism which biases the landing gear such that it is retained in the retracted position.

This therefore further enables configurations in which the landing gear may be retained in the retracted position exclusively by hydraulic pressure. This also facilitates the removal of mechanical uplocks.

The control system may further comprise a pressure transducer configured to monitor hydraulic pressure within the control system, wherein the pressure transducer transmits a signal to the control system to energise the hydraulic pressure source when the control system pressure decays below a predetermined level.

Hydraulic pressure may periodically be supplied by the at least one local hydraulic pressure source in discrete time intervals.

The at least one battery may also be configured to provide power to a prime mover of the battery-powered aircraft.

Advantageously, this co-locates the power source of the prime mover of the aircraft with the power source of the hydraulic control system. This removes the need for engine-driven generator and pump arrangements, which often require an identical redundant back-up onboard and thereby significantly increase overall weight.

The control system may further comprise a pressure transducer configured to monitor hydraulic pressure within the control system. The pressure transducer may transmit a signal to the control system to energise the at least one hydraulic pressure source when the control system pressure decays below a predetermined level. The pressure transducer may transmit a signal to the motor, or a controller of the motor, to energise the hydraulic pressure source when the control system pressure decays below a predetermined level.

The pressure transducer ensures an efficient means of providing power to the at least one hydraulic pressure source. By this means, the at least one hydraulic pressure source is only energised when the pressure transducer detects that it is necessary. In use, during flight, this can save battery power an improve range as a result. This is in contrast to engine-driven central hydraulic systems, which are powered constantly during flight.

The at least one local hydraulic pressure source may comprise:

a primary hydraulic pressure source in fluid communication with at least one primary actuator and configured to move the main landing gear between the extended position and the retracted position in response to inputs received by the landing gear controller; and an alternate hydraulic pressure source in fluid communication with at least one alternate actuator, the alternate hydraulic pressure source being configured to move the main landing gear between the retracted position and the extended position in response to inputs received by the landing gear controller. The alternative hydraulic pressure source may be configured to move the main landing gear into the extended position.

The alternate hydraulic pressure source provides a lightweight emergency means of powering the hydraulic consumers of the aircraft. Thus, in event of failure of the primary hydraulic pressure source, the alternate hydraulic pressure source ensures that there is a further means of moving the landing gear between the retracted and extended positions. Specifically, the alternate hydraulic pressure source ensures that the landing gear may be extended in event of failure of the primary hydraulic pressure source.

The alternate hydraulic pressure source may be de-energised while the primary hydraulic pressure source is in use.

By keeping the alternate hydraulic pressure source de-energised during normal use, the service life of the components therein-such as the motor and the pump—may be preserved.

The primary hydraulic pressure source may comprise at least one alternate extension vent valve configured to vent hydraulic pressure to allow the main landing gear to move from the retracted position to the extended position.

The at least one alternate extension vent valve may be in fluid communication with a return line of the control system and a retraction chamber of a main landing gear actuator.

The at least one alternate extension vent valve provides an arrangement which, in emergency situations, vents the pressure within the retraction chamber to low-pressure. By venting this pressure, the associated landing gear may be permitted to free-fall to the extended position under the action of gravity.

The control system may further comprise a brake control system in fluid communication with the at least one local hydraulic pressure source.

The brake control system may comprise:

a primary brake control system, in fluid communication with the primary hydraulic pressure source, configured to activate a brake of the main landing gear; and an alternate brake control system in fluid communication with the alternate hydraulic pressure source, configured to activate the brake of the main landing gear.

This provides an emergency means of powering the brakes of the aircraft. The provision of an alternate brake control system allows the brakes to be powered in case of failure of the primary brake control system or instances in which the primary hydraulic power source fails.

The alternate hydraulic power pack may comprise a pressure transducer configured to monitor hydraulic pressure within the control system and wherein the pressure transducer transmits a signal to the control system to periodically energise the hydraulic pressure source from the battery such that the brake of the main landing gear is pressurised to maintain park brake pressure in the alternate brake control system.

Thus, park brake pressure may be provided by the control system using hydraulic pressure without the use of an accumulator. Wheel chocks are not always available. For example, ground crew may not be able to set the chocks in adverse weather conditions. This configuration provides a means by which the aircraft may still be maintained in a stationary position. As the pressurisation of the hydraulic pressure source is periodic, this consumes very little battery power and thus park brake pressure may be maintained for an extended period.

The control system may further comprise an accumulator configured to store hydraulic pressure. The accumulator may be in fluid communication with the alternate brake control system such that it is configured to activate the brake of the main landing gear. The accumulator may be configured to provide pressure to control system such that the brake of the main landing gear is pressurised to maintain park brake pressure in the alternate brake controls system.

The nose landing gear may comprise a primary nose landing gear extension-retraction system. The nose landing gear extension-retraction system may comprise an actuator in fluid communication with the primary hydraulic pressure source. The nose landing gear may therefore be hydraulically powered in some configurations. The primary nose landing gear actuator may be configured to extend or retract the nose landing gear in response to inputs received by the landing gear controller.

The nose landing gear may further comprise an alternate extension-retraction system. The nose landing gear alternate extension-retraction system may comprise an actuator in fluid communication with the primary hydraulic pressure source, wherein the primary nose landing gear actuator is configured to extend or retract the nose landing gear in response to inputs received by the landing gear controller.

The control system may further comprise a steering control system. The steering control system may be arranged in fluid communication with the primary hydraulic pressure source. The control system may therefore be hydraulically powered in some configurations.

The steering control system and the nose landing gear may be configured to receive power from the at least one battery. The nose landing gear and the steering control system may therefore be electrically powered in some configurations.

The at least one battery may comprise a plurality of batteries. The nose landing gear may be configured to receive power from at least one of the plurality of batteries.

The steering control system and the nose landing gear may be configured to receive power from at least one of the plurality of batteries.

According to a further aspect of the invention, there is provided an aircraft comprising the control system according to the first aspect of the present invention.

BRIEF DESCRIPTION OF THE DRAWINGS

Further features and advantages of the present invention will be further described below, by way of example only, with reference to the accompanying drawings in which.

DETAILED DESCRIPTION

The disclosure herein provides improvements in systems for operating the landing gear of an aircraft.

Figure 1:
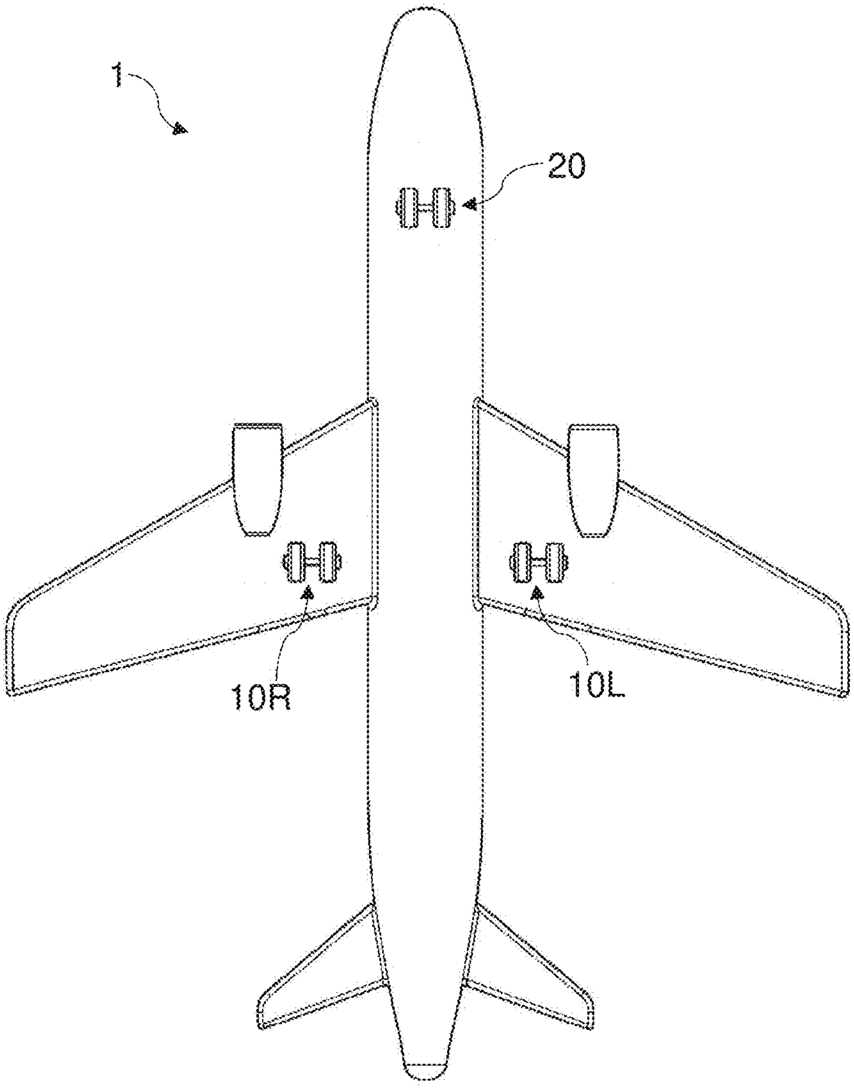
FIG. 1 shows an example of a landing gear configuration on an aircraft.

FIG. 1 illustrates an aircraft 1 which comprises a landing gear arrangement. The landing gear arrangement generally comprises right-hand and left-hand main landing gear assemblies 10 and nose landing gear assembly 20. The right-hand main landing gear assembly is distinguished by the suffix "R" and the left-hand main landing gear assembly is distinguished by the suffix "L". For illustrative purposes the landing gear arrangement is depicted with a left-hand main landing gear 10L, a right-hand main landing gear 10R, and a single nose landing gear 20. It will be appreciated that there are many arrangements of landing gear which may be compatible with the teaching herein and therefore the landing gear arrangement is not limited to the arrangement shown.

The main landing gear assemblies 10 and the nose landing gear assembly 20 are moveable between an extended position and a retracted position. In the extended position the landing gear 10, 20 is projected downwards. In this position the landing gear 10, 20 is preferably mechanically locked. In the retracted position the landing gear is stowed upwards such that it is not within the local airstream during flight. In this position the landing gear 10, 20 is typically stowed within a recess of the aircraft body 1.

Figure 2:
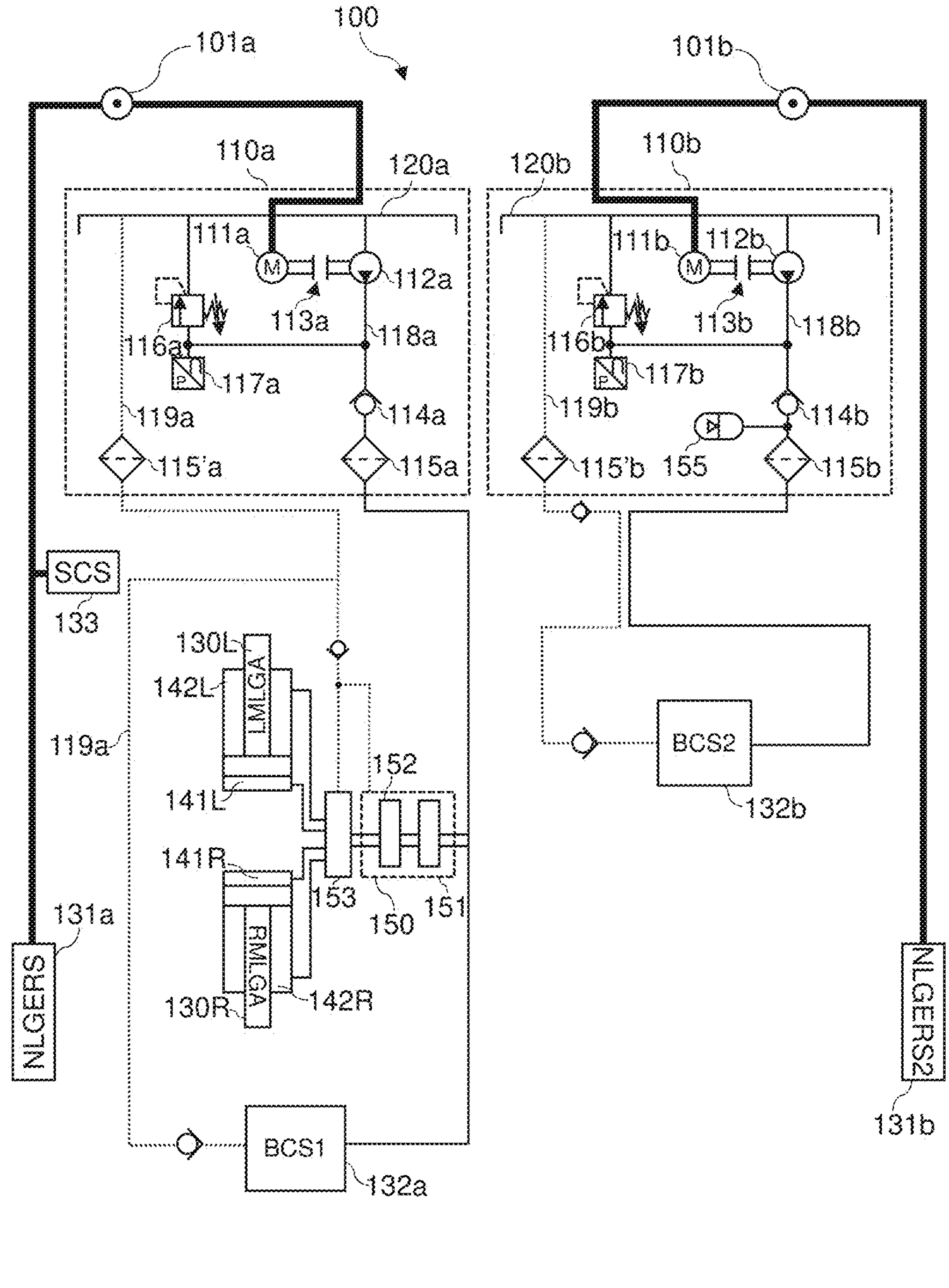
FIG. 2 shows a schematic illustration of a first control system for aircraft landing gear according to an aspect of the present invention.

FIG. 2 illustrates a first control system 100 for an aircraft 1 according to an aspect of the present invention. The first control system 100 comprises a hybrid hydraulic-electromechanical control system 100. Reference numerals for identical features in the control system 100 are indicated in the drawing with the suffixes "a" and "b", respectively.

The control system 100 comprises at least one power source 101. The at least one power source 101 is preferably configured to deliver electrical energy to the control system 100. In the embodiment of FIG. 2, the power source comprises two batteries 101*a*, 101*b*. The at least one power source 101 may otherwise comprise one or more fuel cells or any other appropriate form of onboard energy storage.

The control system 100 further comprises at least one local hydraulic pressure source 110. The hydraulic pressure source 110 may comprise a hydraulic power pack, hydraulic power unit, hydraulic pump unit, or any other appropriate local hydraulic pressure source. In the embodiment of FIG. 2, the control system 100 comprises two hydraulic power packs 110*a*, 110*b*. Specifically, the control system 100 comprises a primary hydraulic power pack 110*a* and an alternate hydraulic power pack 110*b*. It will be appreciated that the control system 100 may comprise more than two hydraulic power packs 110*a*, 110*b*, however the preferred embodiment depicted results in a more lightweight control system 100.

Each hydraulic power pack 110 comprises a high-pressure supply line 118*a* along which hydraulic fluid is propelled to provide hydraulic power. To provide power to the hydraulic circuit, each hydraulic power pack 110 comprises a motor 111. Preferably, the motor 111 comprises an electric motor. Specifically, in the embodiment of FIG. 2, the electric motor comprises a direct current motor. The electric motor 111 is connected to the at least one power source 101 and is configured to convert electrical power to rotational drive, which is subsequently provided to a pump 112. The rotational drive is preferably delivered to the pump 112 by means of a geared arrangement 113. Though illustrated as being connected to separate power sources 101*a*, 101*b*, the electric motors 111*a*, 111*b* of the respective hydraulic power packs 110*a*, 110*b* may otherwise be connected to a common power source 101.

The pump 112 is configured to draw hydraulic fluid from a reservoir 120. The hydraulic fluid is pressurised by the pump 112 and subsequently propelled through the control system 100. Each hydraulic power pack 110 further comprises a low-pressure return line 119*a* along which hydraulic fluid may be returned to the reservoir 120. Though illustrated as drawing fluid from separate reservoirs 120*a*, 120*b*, the pump 112*a*, 112*b* of the respective hydraulic power packs 110*a*, 110*b* may otherwise draw fluid from a single, common reservoir 120. Further, any reservoir 120 may be housed within the hydraulic power pack 110; or otherwise, be arranged externally to the hydraulic power pack 110. For example, the reservoir 120 may comprise a tank which is housed externally to the hydraulic power pack 110.

When propelled through the control system 100, the hydraulic fluid preferably passes through a non-return valve 114 within the hydraulic power pack 110. This valve ensures a unidirectional flow, preventing an adverse pressure gradient from drawing hydraulic fluid back into the pump. The non-return valve 114 may also be provided externally to the hydraulic power pack 110 and is preferably arranged downstream of the pump 112 and upstream of any consumer or actuator receiving hydraulic power. Further, a pressure relief valve 116 and a pressure transducer 117 are preferably arranged in parallel to the pump 112, such that over-pressurised hydraulic fluid may be returned to the reservoir 120 when detected.

Optionally, a filter 115 may be provided downstream of the reservoir 120 and upstream of any component receiving hydraulic power. In the embodiment illustrated, a high-pressure filter 115 is arranged immediately downstream of the non-return valve 114. The high-pressure filter 115 is provided on the supply line 118 of the hydraulic circuit. It will be appreciated that this filter may otherwise be arranged immediately downstream of the pump 112, or of the reservoir 120 itself. Additionally, and also optionally, a low-pressure filter 115' may be arranged immediately upstream of the reservoir 120. The low-pressure filter 115' is provided on the return line 119 of the hydraulic circuit.

The control system 100 comprises a number of actuators which may receive electrical power from the power source(s) 101 or hydraulic power from the hydraulic power pack(s) 110. The control system 100 generally comprises a main landing gear extension-retraction system (MLGERS) 130, a nose landing gear extension-retraction system (NLGERS) 131*a*, a brake control system (BCS1) 132*a*, and a nose wheel steering control system (SCS) 133. The control system 100 may further comprise one or more of an alternate NLGERS system 131*b*, and an alternate BCS (132*b*).

The MLGERS 130L, 130R comprises a left main landing gear actuator (LMLGA) 130L configured to move the left main landing gear 10L between the extended position and the retracted position. The MLGERS 130L, 130R further comprises a right main landing gear actuator (RMLGA) 130R configured to move the right main landing gear 10L between the extended position and the retracted position. The main landing gear actuators 130L, 130R each comprise an extension chamber 141L, 141R and a retraction chamber 142L, 142R. The chambers are configured to receive pressurised hydraulic fluid from the primary hydraulic power pack 110*a* in normal use. It will be understood that the term "normal use" general refers to a condition in which the control system 100 is functioning in a fully operational state, and thus no emergency systems are in use. In a fully operational state, the primary hydraulic power pack 110*a* and any consumers thereof are in operation without fault. To extend or retract the MLGERS 130 in normal use, a pilot input is made to a corresponding controller.

Ingress of hydraulic fluid into the cylinders 141, 142 of the main landing gear actuators (MLGAs) 130 is controlled by a MLGERS controller 150. The MLGERS controller 150 may comprise a main landing gear isolation valve 151 and/or a selection valve 152. It will be understood that each of these valves 151, 152 are optional, however both are included in the example of FIG. 2. The main landing gear isolation valve 151 may be arranged upstream of the MLGAs 130. The main landing gear isolation valve 151 is preferably moveable between a first position, in which hydraulic fluid may flow therethrough, and a second position, in which hydraulic fluid is obstructed. The main landing gear isolation valve 151 may be biased in an open position and is configured to selectively isolate the MLGERS from the control system 100. The main landing gear isolation valve 151 prevents the landing gear from being inadvertently actuated.

For redundancy and further protection from inadvertent actuation during flight, a selection valve 152 may be arranged downstream of the main landing gear isolation valve 151 and upstream of the MLGAs 130. The selection valve 152 is moveable between a first position, in which hydraulic fluid may flow into the extension chambers 141 of the MLGAs 130, and a second position, in which hydraulic fluid may flow into the retraction chambers 142 of the MLGAs 130.

During normal use, in flight, the isolation valve 151 is preferably biased in its open position. Otherwise, in embodiments where the isolation valve 151 is biased in a closed position, then the isolation valve 151 is preferably energised such that it is in the open position. Further, during normal use, in flight, it is preferable that the selection valve 152 is in its second position in which hydraulic fluid may flow into the retraction chambers 142 of the MLGAs 130.

For movement to the retracted position, the control system 100 commands the isolation valve 151 to open. In this instance, the selector valve 152 ports pressure to the retraction chambers 142 of the right and left main gear actuators 130. Crucially, with the illustrated configuration, the main landing gear 10 may be maintained in the retracted position by hydraulic pressure. In a conventional landing gear control system, the landing gear 10, 20 is retracted and then subsequently maintained in the retracted position by a mechanical uplock. In contrast, the main landing gear 10 of the control system 100 may be provided without a mechanical uplock, thus reducing weight.

With the configuration of the present invention, the main landing gear 10 may safely be maintained in the retracted position solely hydraulically. To achieve this, the pressure transducer 117*a* may be configured to detect the pressure within the hydraulic power pack 110*a* and the consumers thereof. Whilst the pressure transducer 117*a* is illustrated in FIG. 2 as being located in parallel to the output of the pump 112*a*, it will be appreciated that the pressure transducer may be located elsewhere in the system where a loss of hydraulic pressure may be detected. For example, it may be located between the landing gear actuators and an associated vent valve (see below for discussion of such a vent valve). Upon detection of a decaying pressure level within the system, the power source 101*a* may receive a signal from the pressure transducer 117*a* to provide power to the hydraulic power pack 110*a*. Thus, hydraulic fluid may be circulated on-command in order to increase the pressure in the system. The hydraulic power pack 110*a* may therefore periodically pressurise the MLGERS 130 such that the main landing gear 10 is maintained in the retracted position. Advantageously, this uses little power in use and can therefore be performed over long periods of time without affecting the power available for other electrical consumers within the aircraft 1. This is also more efficient than a central hydraulic system, which circulates hydraulic fluid constantly. Further, this feature facilitates the omission of mechanical uplocks and in turn significantly reduces the overall weight of the main landing gear.

The primary hydraulic power pack 110*a* notably omits an accumulator. As an accumulator requires constant pressure, including one is not compatible with the configuration of the primary hydraulic power pack 110*a* when arranged to periodically pressurise the MLGERS 130.

For movement to the extended position, the control system 100 subsequently commands the isolation valve 151 to open. The selector valve 152 then ports pressure to an extension chamber 141 of the main landing gear actuator 130. The main landing gear 10 is subsequently moved to the extended position.

The main landing gear 10 may also be provided without doors. Thus, the main landing gear 10 is preferably stowed in an open recess of the aircraft body when in the retracted position. This removes the requirement for any sequencing mechanisms that delay the timing of extension in order to first open the doors. Similarly to the omission of any mechanical uplock, an omission of doors removes a possible point of failure in the system 100.

The brake control system 132 may comprise a primary BCS 132*a* and an alternate brake control system 132*b*, as shown in FIG. 2. The primary BCS 132*a* is configured to receive hydraulic power from the primary hydraulic power pack 110*a* by being arranged in fluid communication with the supply line 118*a* and the return line 119*a*. Flow to the primary BCS 132*a* may controlled by a brake system isolation valve (not shown). The brake system isolation valve is preferably moveable between a first position, in which hydraulic fluid is obstructed from ingress to the brake control system 132*a*; and a second position, in which hydraulic fluid may flow into the brake control system 132*a*. In this way, the brake system isolation valve may prevent inadvertent activation of the brakes.

In the hybrid control system 100 of FIG. 2, the NLGERS 131*a* and the SCS 133 receive electrical power directly from the power source 101*a*. Specifically, the NLGERS 131*a* and the SCS 133 are solely powered by the power source 101*a*. Thus, in this arrangement, there is no need for any hydraulic line between the main landing gear 10 and the nose landing gear 20. This advantageously reduces the complexity of the hydraulic circuit and removes potential points of failure.

In emergency situations, the landing gear 10 may be permitted to free-fall. This can be achieved by venting the pressure within the retraction and extension chambers 141 and 142 to low-pressure. For example, the both chambers may be vented to the low-pressure return line 119*a*. Preferably, for alternate or emergency extension, the control system 100 therefore further comprises an alternate extension vent valve 153.

The alternate extension vent valve 153 is preferably in fluid communication with the retraction and extension chambers of either of the two MLGA 130 and the low-pressure return line 119*a* of the control system 100. When activated, the vent valve 153 is configured to vent the high pressure in the MLGAs 130 by providing a bypass to the low-pressure return line 119*a*. This function can be activated in event of normal system failure and provides an alternate means of venting the control system 100 to low-pressure to reduce the pressure therein. It will be appreciated by the person skilled in the art that the vent valve 153 may be provided to both of the right and left MLGAs 130. In the embodiment of FIG. 2, the vent valve 153 is provided to both the right and left MLGAs 130 by being provided upstream thereof.

In embodiments without mechanical uplocks, emergency extension of the main landing gear 10 is advantageously simplified. This is because there is no need to first release the mechanical uplock in order to allow free-fall. The lack of an uplock also contributes to the weight-savings of this configuration. Removing a possible point of failure additionally removes the risk of mechanical uplock failure preventing extension of the main landing gear 10.

Ordinarily the alternate power pack 110*b* is de-energised "powered down" (or alternatively placed in a low power 'standby' condition). Specifically, the power source 101*b* does not supply power to the alternate hydraulic power pack 110*b* in this mode of operation of the control system 100. In event of the vent valve 153 of the primary hydraulic power pack 110*a* being activated or some other failure in the primary system being detected, however, the alternate power pack 110*b* is powered up. The primary hydraulic power pack 110*a* is "powered down" whilst the alternate power pack 110*b* is activated. Specifically, in alternate or emergency use, the power source 101*a* stops supplying power to the primary hydraulic power pack 110*a*. Alternatively, both power packs may be operated in an active condition. In this case the mode of operation remains the same as described above, i.e. the secondary power pack is only utilised in the event of a failure, but as the secondary power pack is already activated, the response time to switch from the primary to the secondary is reduced.

In alternate or emergency use, the alternate hydraulic power pack 110*b* functions similarly to the primary hydraulic power pack 110*a*. However, the alternate hydraulic power pack 110*b* may include an accumulator 155 in parallel with the electric motor 112*b* so that in the event of failure of both the primary and secondary power packs and/or failure of both the primary and secondary power sources stored hydraulic energy is available from the accumulator for emergency braking.

The alternate hydraulic power pack 110*b* comprises the aforementioned alternate BCS 132*b*. The alternate BCS 132*b* may provide alternate or emergency braking to the main landing gear 10 by receiving hydraulic power from the alternate hydraulic power pack 110*b*. Further, the alternate BCS 132*b* may be configured to provide park braking to the main landing gear 10. To achieve this, an alternate pressure transducer 117*b* may be provided. The alternate pressure transducer 117*b* may monitor the pressure within the alternate hydraulic power pack 110*b* and the consumers thereof. If the pressure drops below a predetermined level, the alternate pressure transducer 117*b* may transmit a signal to the system 100 to energise the alternate hydraulic pressure pack 110*b* when the pressure decays below the predetermined level. This can be used to maintain park brake pressure in the alternate brake control system 132*b*. Alternatively, pressurised hydraulic fluid in the accumulator 155 may be used to maintain park brake pressure in the alternate brake control system 132*b*. This is particularly advantageous when wheel chocks are not available.

Figure 3:
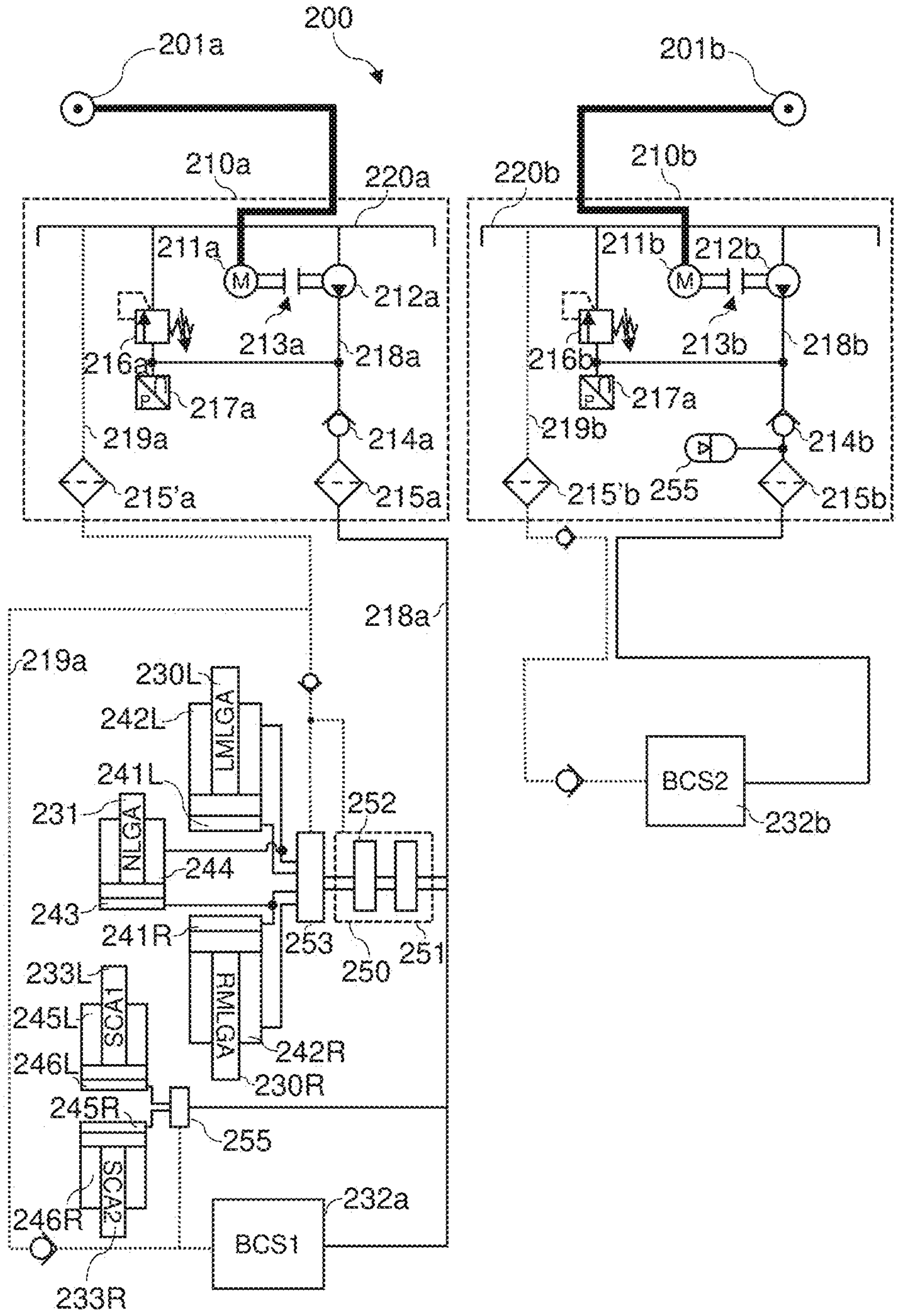
FIG. 3 shows a schematic illustration of a second control system for an aircraft landing gear according to a further aspect of the present invention.

FIG. 3 shows a second control system 200 for an aircraft 1 according to an aspect of the present invention. The second control system 200 comprises a hydraulic control system 200. In the hydraulic control system 200, the steering control system 233 of the aircraft 1 is hydraulically powered, rather than receiving electrical power from the power source(s) 201*a*, 201*b*. In this embodiment, the electrically powered NLGERS may also be replaced with a nose landing gear actuator (NLGA) 231 which is hydraulically powered.

The steering control system 233 is configured to receive hydraulic power from the primary hydraulic power pack 210*a* by being arranged in fluid communication with the supply line 218*a* and the return line 219*a*. The steering control system 233 comprises a pair of steering control actuators (SCA) 233L, 233R. The SCAs 233L, 233R of FIG. 3 comprise hydraulic actuators. Flow to the steering control system 233 is controlled by a steering control system 255. The steering control system may comprise an isolation valve. The isolation valve of the steering control system 255 is moveable between a first position, in which hydraulic fluid is obstructed from ingress to the steering control system 233; and a second position, in which hydraulic fluid may flow into the steering control system 233. In this way, the steering control system isolation valve 255 prevents inadvertent activation of the steering of the aircraft 1.

The NLGERS may comprise a nose landing gear actuator (NLGA) 231. The NLGA 231 may comprise an extension chamber 243, and a retraction chamber 244. The NLGA 231 is configured to receive hydraulic power from the primary hydraulic power pack 210*a* by being arranged in fluid communication with the supply line 218*a*. As can be seen in the illustration of FIG. 3, the hydraulic lines of the NLGA 231 are arranged downstream of the hydraulic lines of the MLGA 230L, 230R. With this arrangement, the redundancy and safety provided by the inclusion of the isolation and selector valves 251, 252 may also be provided to the NLGA without the need for the addition of further valves to the system.

To move the landing gear 10, 20 to the retracted position, the control system 200 commands the isolation valve 251 to open. The selector valve 252 ports pressure to the retraction chambers 242, 244 of the main landing gear actuators 230 and the nose landing gear actuator 231. As noted with reference to the hybrid control system 100, the hydraulic control system 200 enables the main landing gear 10 to be maintained in the retracted position solely by hydraulic pressure. In addition to this, the nose landing gear 20 may be maintained in the retracted position solely by hydraulic pressure by the same function.

To move the landing gear 10, 20 to the extended position, the control system 200 commands the isolation valve 251 to open. The selector valve 252 then ports pressure to the extension chambers 241, 243 of the main landing gear actuators 230 and the nose landing gear actuator 231. The main landing gear 10 and the nose landing gear 20 is subsequently moved to the extended position.

In emergency situations, the landing gear 10, 20 may be permitted to free-fall. In this embodiment, this can be performed for both the main landing gear 10 and the nose landing gear 20. As with the hybrid control system 100, this can be achieved in the hydraulic control system 200 by venting the pressure within the retraction chambers 242, 244 to low-pressure. For example, the retraction chambers 242, 244 may be vented to the low-pressure return line 219*a*. Preferably, for alternate or emergency extension, the control system 200 therefore further comprises an alternate extension vent valve 253. The alternate extension vent valve 253 is in fluid communication with the retraction chambers 242, 244 of the actuators 230, 231 and the low-pressure return line 219*a* of the control system 200. When activated, the vent valve 253 is configured to vent the high pressure in the actuators 230, 231 by providing a bypass to the low-pressure return line 219*a*. This function can be activated in event of normal system failure and provides an alternate means of venting the control system 200 to low-pressure to reduce the pressure therein. It will be appreciated by the person skilled in the art that the vent valve 253 may be provided to both of the right and left MLGAs 230.

Figure 4:
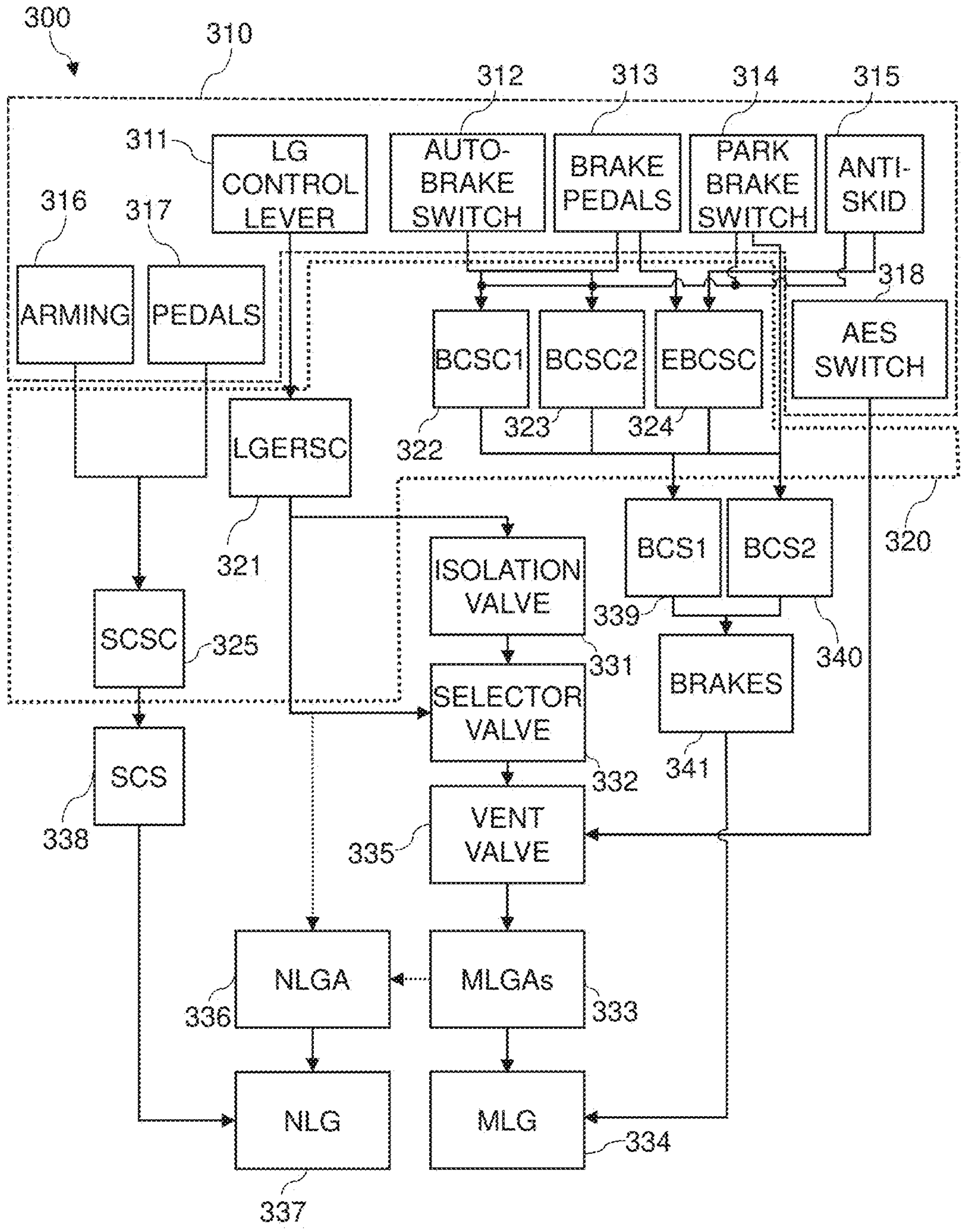
FIG. 4 shows a block diagram of a landing gear system according to a yet further aspect of the present invention.

FIG. 4 shows a landing gear system 300 which may incorporate the control systems 100, 200 of either of FIG. 2 or FIG. 3.

The landing gear system 300 comprises a plurality of flight deck controls 310. The flight deck controls 310 comprise a landing gear control lever 311 configured to receive retraction and extension commands from a user. Various braking controls may be included in the flight deck controls 310. The illustrated example includes: an autobrake switch 312, which allows automated control of the braking functions; brake pedals 313, which are configured to receive manual braking input signals from a user; a park brake switch 314, configured to receive a park brake input signal from a user; and an anti-skid off switch 315, which may receive a signal from a user to toggle between normal or alternate braking with traction or skid control to emergency braking without skid control. The flight deck controls 310 further comprise an arming switch 316 configured to selectively open or close a circuit of an associated steering control system 338. Rudder pedals 317 are also included in the flight controls 310, which are operable to control rudders of an aircraft when the circuit of the associated steering control system 338 is closed. An alternate extension switch 318 may also be included in the flight deck controls, which is configured to provide an alternate or emergency means of moving the associated landing gear to the extended position. It will be appreciated that the flight deck controls 310 are not limited to the illustrated controls and may further comprise additional controls. In some embodiments, some of these controls 310 may be omitted.

The landing gear system 300 further comprises a plurality of controllers 320 which are configured to convert users inputs into data signals or electrical signals to be delivered to the appropriate control system or component. The controllers 320 include: a landing gear extension and retraction system controller 321, configured to receive inputs from the landing gear control level 311; a primary brake control system controller 322, configured to receive inputs from the various braking controls 312-315 in normal use; an alternate brake control system controller 323, also configured to receive inputs from the various braking controls 312-315 in normal use; and an emergency brake control system controller 324, configured to receive inputs from the brake pedals 313 and the anti-skid off switch 315. The landing gear system 300 further comprises a steering control system controller 325, configured to receive user inputs from the rudder pedals 317 when the arming switch 316 is closed.

The landing gear system 300 conveys the signals received in the controllers 320 to a number of components which, themselves, generate outputs in a number of actuators. For example, the landing gear system 300 may comprise an isolation valve 331 which may be opened by the landing gear extension retraction controller 321 in response to a user input to the landing gear control lever 311. The position of a selector valve 332 may also be moved, according to the input made to the landing gear control level 311, to select whether the associated landing gear is being extended or retracted. This allows main landing gear actuators 333 to receive hydraulic power which in turn can be used to move the main landing gear 334 to the extended position, or to the retracted position. In some configurations, such as the one depicted in FIG. 3, the nose landing gear actuator 336 may receive hydraulic power in response to the same user input. This can be used to move the nose landing gear 337 to the extended position, or to the retracted position. Otherwise, the nose landing gear actuator 336 may be configured to receive electrical power and therefore directly receive electrical signals from the landing gear extension retraction controller 321 in conjunction with electrical power, which may be used to move the nose landing gear 337 to the extended position, or to the retracted position.

An alternate extension switch 318 may be connected to a vent valve 335 of the landing gear system 300. Upon activation of the switch 318, the vent valve 335 is configured to vent pressure from a retraction chamber of the main landing gear actuator 333 to a return line of the associated hydraulic circuit. This moves the main landing gear 334 to the extended position. The alternate extension switch 318 provides a redundant means of extending the main landing gear 334. In embodiments in which the nose landing gear actuator 336 is hydraulically powered, the alternate extension vent valve 335 also vents the nose landing gear actuator 336.

The steering control system 338 may be actuated in response to inputs from the steering control system controller 325. Although not illustrated in FIG. 4, it will be understood that the configurations shown in FIGS. 2 and 3 describe the actuation mechanisms for the steering control system 338 and that either hydraulic power or electrical power may be supplied thereto.

The primary brake control system 339 and the alternate brake system 340 hydraulically actuate the brakes 341 of the main landing gear 334 in response to inputs made to the various braking controls 312-315.

Various modifications, whether by way of addition, deletion and/or substitution, may be made to all of the above-described embodiments to provide further embodiments, any and/or all of which are intended to be encompassed by the appended claims.

The invention claimed is:

1. A control system for a battery-powered aircraft, the control system comprising:

a landing gear assembly moveable between a retracted position in which the landing gear assembly is housed within the aircraft and an extended position in which the landing gear assembly is deployed from the aircraft, the landing gear assembly comprising:

a main landing gear; and a nose landing gear;

at least one local hydraulic pressure source configured to receive power from at least one battery;

a landing gear controller configured to receive and deliver control inputs to the at least one local hydraulic pressure source; and at least one actuator in fluid communication with the at least one local hydraulic pressure source and configured to move the landing gear assembly between the retracted position and the extended position in response to inputs received by the landing gear controller;

wherein the control system is configured to maintain at least one of the main landing gear and nose landing gear in the retracted position by hydraulic pressure which is periodically supplied by the at least one local hydraulic pressure source.

2. The control system according to claim 1, further comprising a pressure transducer configured to monitor hydraulic pressure within the control system, wherein the pressure transducer transmits a signal to the control system to energise the hydraulic pressure source when the control system pressure decays below a predetermined level.

3. The control system according to claim 1, wherein hydraulic pressure is periodically supplied in discrete time intervals by the at least one local hydraulic pressure source.

4. The control system according to claim 1, wherein the at least one local hydraulic pressure source comprises:

a primary hydraulic pressure source in fluid communication with at least one primary actuator and configured to move the main landing gear between the extended position and the retracted position in response to inputs received by the landing gear controller; and an alternate hydraulic pressure source comprising an alternate actuation system, the alternate actuation system being configured to move the main landing gear between the extended position and the retracted position landing gear in response to inputs received by the landing gear controller.

5. The control system according to claim 4, wherein the alternate hydraulic pressure source is de-energised while the primary hydraulic pressure source is in use.

6. The control system according to claim 4, wherein the primary hydraulic pressure source comprises at least one alternate extension vent valve configured to vent hydraulic pressure to allow the main landing gear to move from the retracted position to the extended position.

7. The control system according to claim 6, wherein the alternate extension vent valve is in fluid communication with a return line of the control system and a retraction chamber of a main landing gear actuator.

8. The control system according to claim 4, further comprising a brake control system in fluid communication with the at least one local hydraulic pressure source, wherein the brake control system comprises:

a primary brake control system, in fluid communication with the primary hydraulic pressure source, configured to activate a brake of the main landing gear; and an alternate brake control system in fluid communication with the alternate hydraulic pressure source, configured to activate the brake of the main landing gear.

9. The control system according to claim 8, wherein the alternate hydraulic power pack comprises a pressure transducer configured to monitor hydraulic pressure within the control system and wherein the pressure transducer transmits a signal to the control system to periodically energise the hydraulic pressure source from the battery such that the brake of the main landing gear is pressurised to maintain park brake pressure in the alternate brake control system.

10. The control system according to claim 7, further comprising an accumulator configured to store hydraulic pressure and wherein the accumulator is in fluid communication with the alternate brake control system such that it is configured to activate the brake of the main landing gear.

11. The control system according to claim 4, wherein the nose landing gear comprises a primary nose landing gear actuator in fluid communication with the primary hydraulic pressure source, wherein the primary nose landing gear actuator is configured to extend or retract the nose landing gear in response to inputs received by the landing gear controller.

12. The control system according to claim 4, further comprising a steering control system, wherein the steering control system and the nose landing gear are configured to receive power from the at least one battery.

13. The control system according to claim 1, wherein the landing gear assembly omits mechanical uplocks.

14. An aircraft comprising the control system of claim 1.

* * * * *